(12) United States Patent
Rao

(10) Patent No.: US 11,743,478 B2
(45) Date of Patent: Aug. 29, 2023

(54) VIDEO STREAM TRANSCODING WITH REDUCED LATENCY AND MEMORY TRANSFER

(71) Applicant: International Business Machines Corporation, Armonk, NY (US)

(72) Inventor: Rajat Rao, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/347,657

(22) Filed: Jun. 15, 2021

(65) Prior Publication Data

US 2022/0400274 A1 Dec. 15, 2022

(51) Int. Cl.
*H04L 12/00* (2006.01)
*H04N 19/423* (2014.01)
*H04N 19/40* (2014.01)
*H04L 65/70* (2022.01)

(52) U.S. Cl.
CPC ........... *H04N 19/423* (2014.11); *H04L 65/70* (2022.05); *H04N 19/40* (2014.11)

(58) Field of Classification Search
CPC ....... H04L 65/70; H04N 19/423; H04N 19/40
USPC .................................................. 709/215–217
See application file for complete search history.

(56) References Cited

U.S. PATENT DOCUMENTS

| | | | | |
|---|---|---|---|---|
| 8,249,144 B2* | 8/2012 | Gutman | ................. | H04N 19/40 |
| | | | | 375/240.26 |
| 8,442,122 B2* | 5/2013 | Lefol | ................... | H04N 19/156 |
| | | | | 375/240.25 |
| 10,327,040 B1 | 6/2019 | Shen | | |
| 11,073,969 B2* | 7/2021 | Brockmann | ... | H04N 21/234309 |
| 11,483,580 B2* | 10/2022 | Bruns | .................... | H04N 19/19 |
| 11,611,760 B2* | 3/2023 | Syed | .................... | H04N 19/167 |
| 2002/0186769 A1* | 12/2002 | O'Brien | ................ | H04N 19/40 |
| | | | | 348/E5.111 |
| 2003/0002583 A1* | 1/2003 | Geerlings | .............. | H04N 19/40 |
| | | | | 375/E7.129 |
| 2010/0158098 A1* | 6/2010 | McSchooler | .. | H04N 21/440218 |
| | | | | 375/240.01 |
| 2019/0069004 A1 | 2/2019 | Badawiyeh | | |
| 2020/0029086 A1 | 1/2020 | Zou | | |
| 2020/0162795 A1 | 5/2020 | Kocks | | |
| 2020/0288209 A1* | 9/2020 | Fassnacht | .............. | G06N 20/00 |
| 2021/0092468 A1* | 3/2021 | Szatmary | ....... | H04N 21/234309 |
| 2021/0250626 A1* | 8/2021 | Guo | ............... | H04N 21/234345 |

* cited by examiner

*Primary Examiner* — Frantz Coby
(74) *Attorney, Agent, or Firm* — Aaron N. Pontikos

(57) ABSTRACT

A method for transcoding an encoded video stream uploaded to a host server that includes a video transcoding engine connected to the server. At least one processor of the video transcoding engine receives an encoded video stream from a client computing device in which the encoded video stream is directly received by the video transcoding engine connected to the host server and the video transcoding engine has direct access to a non-volatile memory of the host server. The at least one processor of the video transcoding engine generates one or more transcoded files in real-time from the encoded video stream. The at least one processor transfers the one or more transcoded video files from the video transcoding engine directly to the non-volatile memory of the host server.

20 Claims, 3 Drawing Sheets

US 11,743,478 B2

VIDEO STREAM TRANSCODING WITH REDUCED LATENCY AND MEMORY TRANSFER

FIELD OF THE INVENTION

The present invention relates generally to the field of media streaming technology, and more particularly to real-time transcoding of video stream content with reduced memory transfers and reduced latency.

BACKGROUND OF THE INVENTION

Video streaming has become a popular form of delivery of visual media, based on the ability to provide on-demand delivery across a variety of devices and format requirements. Video streaming is delivered as a compressed and encoded content stream and includes a set of parameters defining the format of the content. The process of transcoding the video stream involves transforming the content with one set of parameters into content with another set of parameters. The parameters depend on aspects of the encoding of the video content, such as the resolution of the video, the bitrate of the stream, and the frame rate of playing the video, among others.

Transcoding of a video stream into multiple formats accommodates the operation of the video on various devices, such as desktop computers, laptops, tablets, and smartphones. The receipt and processing of a video stream include a series of memory write, read, and transfer steps, which adds to the latency of transcoding.

SUMMARY

Embodiments of the present invention disclose a method, computer program product, and system for transcoding an encoded video stream, the method provides for at least one computer processor receiving an encoded video stream from a client computing device in which the encoded video stream is directly received by the video transcoding engine integrated with a host server and the video transcoding engine has direct access to a non-volatile memory of the host server. The at least one computer processor generating one or more transcoded video files in real-time from the encoded video stream, and the at least one processor transferring the one or more transcoded video files from the video transcoding engine directly to the non-volatile memory of the host server.

DETAILED DESCRIPTION

Figure 1:
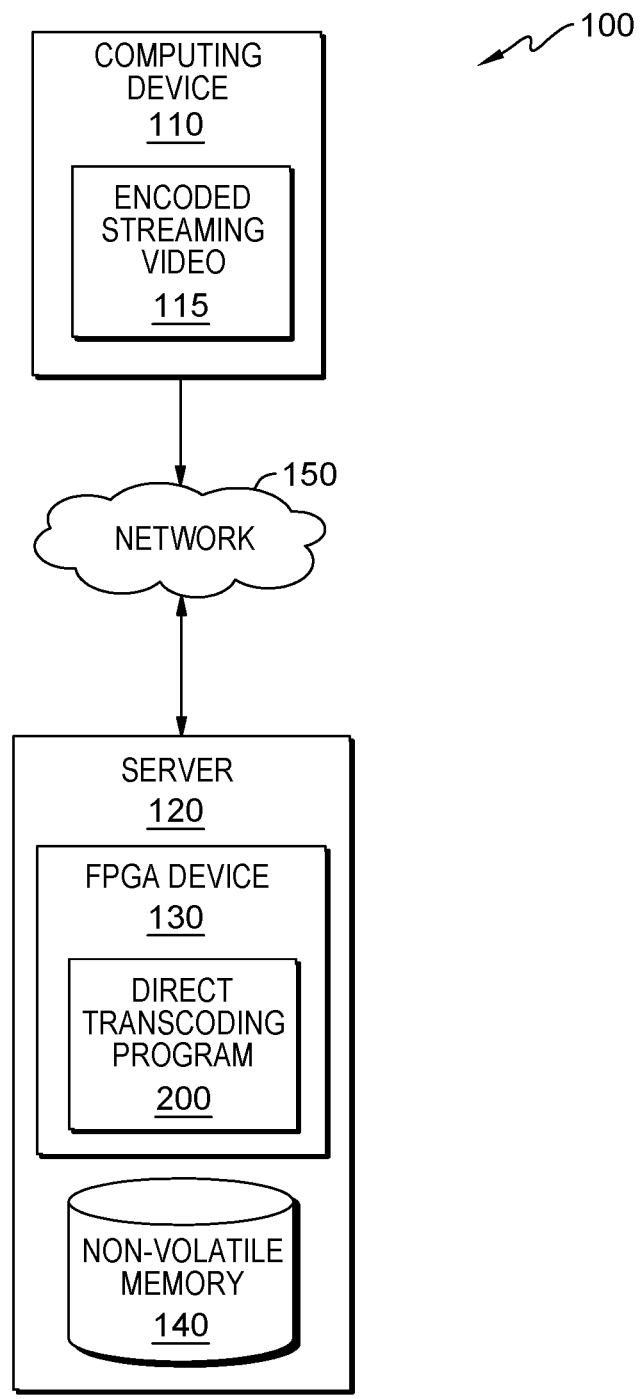
FIG. 1 is a functional block diagram illustrating a distributed data processing environment, in accordance with an embodiment of the present invention.

Embodiments of the present invention recognize that video streaming is transmitted in an encoded format and requires transcoding, which involves a process of converting video content encoded with one set of parameters to another set of parameters. The conversion generates multiple decoded formats enabling the streaming video to correctly operate on various receiving devices. Embodiments recognize that online video streaming services transcode the video content uploaded to servers into multiple format types for storage, enabling ready and available content on-demand to a variety of user devices. Examples of video encoding parameters include video resolution, such as 720p, 1080p, Full High Definition (HD), 4K; video delivery bitrate, such as 2 Mbps (megabits per second), 5 Mbps; and video frame rate, such as 20 fps (frames per second), 30 fps, etc.

Embodiments of the present invention recognize the current video streaming often practices receiving the video content by a server and offloading the transcoding of the streaming video content to a graphical processing unit (GPU), and requires multiple memory transfers. For example, a server receives the uploaded streaming video and copies the video content to the server's memory. The server copies the video content from the server memory to the GPU local memory. The GPU performs transcoding operations which are output to the GPU memory. The transcoded output is copied from the GPU memory back to the server's memory, and the server stores the transcoded video content by transferring the transcoded output files from the server's local memory to the server's non-volatile memory. The multiple memory transfer steps result in a higher latency of the transcoding process, and the multiple transfer steps result in higher power consumption.

Embodiments of the present invention provide a method, computer program product, and computer system for transcoding encoded streaming video and other streaming media. For clarity in describing the features of embodiments of the present invention, discussion and examples will be directed to encoded streaming video media; however, one of ordinary skill in the art will recognize that encoded media types other than video media will also benefit by applying the features described herein. In some embodiments, a video transcoding engine integrated with a host server receives the encoded streaming video uploaded from a client computing device directly. In some embodiments, a field-programmable gate array (FPGA) chip programmed to directly receive the encoded streaming video feed, performs the video transcoding engine functions of transcoding the received streaming video, and transferring the multiple transcoded files to non-volatile server storage. In some embodiments, the server directs the incoming streaming video to an on-chip or off-chip FPGA or an application-specific integrated circuit (ASIC) as the video transcoding engine. For simplicity, embodiments will refer to an FPGA device integrated with the receiving host server as a representative example of performing the functions of a video transcoding engine, while acknowledging that other device and techniques may accomplish the function of transcoding. In some embodiments, the use of network software ports or a dedicated IP address, or other techniques enables splitting of the connection between the client computing device and the server, which can be built through a network protocol, such as hypertext transfer protocol (HTTP), real-time streaming protocol (RTSP), User Datagram Protocol (UDP), and the like. The splitting of the connection enables the control information to flow to the server and the incoming encoded streaming video to flow directly to the video transcoding engine.

In other embodiments, the application of a coherent accelerator-processor interface (CAPI) protocol enables an FPGA to access the non-volatile memory as part of the server's address space, effectively creating a coherency of the non-volatile memory as seen by the server and the FPGA. In such embodiments, subsequent to the FPGA writing directly to the non-volatile memory, the hosting server receives a communication regarding the state of the non-volatile memory. In other embodiments, other protocols, such as an abstract control model (ACM)/communication device class (CDC) may be used similarly to create a coherency of the non-volatile memory for the server and the FPGA.

In one embodiment, the receiving server includes an FPGA card attached as a component, and the FPGA configuration enables interception of the encoded streaming video network traffic intended for the server. In the embodiment, a user uploads encoded streaming video, connecting to the server from a computing device. In the embodiment, the server directs the incoming encoded streaming video to the FPGA memory and the FPGA transcodes the streaming video into multiple video file formats as per preset configurations. Subsequent to completion of the transcoding of the streaming video, the FPGA signals the server, which prepares a transfer directly to the server's non-volatile memory from the FPGA. The FPGA transfers the transcoded video files directly from the memory of the FPGA into the non-volatile memory of the hosting server, bypassing a memory transfer to the server memory (volatile). Embodiments of the present invention provide an improvement over the existing methods of transcoding streaming video, which results in the server being significantly more available to perform other tasks because of the reduction of the memory bandwidth of transfers to and from the server.

The present invention will now be described in detail with reference to the Figures. FIG. 1 depicts a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 and server 120 interconnected via network 150. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communication between computing device 110, server 120, and other components of distributed data processing environment 100, not shown.

Computing device 110 includes encoded streaming video 115 and computing device 110 serves as the source of uploading encoded streaming video 115 to FPGA device 130, depicted as integrated with server 120. The uploading of encoded streaming video 115 involves direct delivery to FPGA device 130 instead of the volatile memory of server 120. FPGA device 130 receives encoded streaming video 115 in a compressed format into the volatile memory of FPGA device 130 at which point FPGA device 130 performs transcoding of encoded streaming video 115. In some embodiments, splitting of the connection between computing device 110 and server 120 enables encoded streaming video 115 to be delivered directly to FPGA device 130, and the connection can be split by use of a modified network protocol and specified network ports or a dedicated Internet Protocol (IP) address. Alternatively, establishing a coherency of the non-volatile memory (i.e., long-term storage) by making the FPGA device 130 access the non-volatile memory as part of server 120's address space, enables FPGA device 130 to transfer the multiple formats of transcoded streaming video to non-volatile memory 140 of server 120.

In some embodiments, computing device 110 can be a blade server, a web server, a laptop computer, a desktop computer, a standalone mobile computing device, a smartphone, a tablet computer, or another electronic device or computing system capable of receiving, sending, and processing data. In other embodiments, computing device 110 may be a computing device interacting with applications and services hosted and operating in a cloud computing environment. In another embodiment, the computing device 110 can be a netbook computer, a personal digital assistant (PDA), or other programmable electronic devices capable of receiving data from and communicating with other devices (shown and not shown) in distributed computer processing environment 100, via network 150. Computing device 110 may include internal and external hardware components, depicted in more detail in FIG. 3.

Server 120 includes FPGA device 130 and non-volatile memory 140. Server 120 can be a blade server, a web server, a laptop computer, a desktop computer, a standalone mobile computing device, a smartphone, a tablet computer, or another electronic device or computing system capable of receiving, sending, and processing data. In other embodiments, server 120 may be a computing device interacting with applications and services hosted and operating in a cloud computing environment. In another embodiment, server 120 can be a netbook computer, a personal digital assistant (PDA), or other programmable electronic devices capable of receiving data from and communicating with computing device 110 via network 150, as well as enabling the operation of direct transcoding program 200. Alternatively, in some embodiments, server 120 may be communicatively connected to direct transcoding program 200, operating remotely (not shown). Server 120 receives signals from the FPGA or ASIC indicating the completion of transcoding of video files and sets up a direct transfer of the files to non-volatile memory. Server 120 may include internal and external hardware components, depicted in more detail in FIG. 3.

Server 120 includes FPGA device 130 which, as depicted in FIG. 1, includes direct transcoding program 200. Direct transcoding program 200 performs transcoding of encoded streaming video 115 received directly by FPGA device 130. In some embodiments of the present invention, FPGA device 130 functions as a component on a PCIe card installed in server 120 and includes one or more processors, memory, and a communication bus or fabric connecting the components of FPGA device 130. FPGA device 130 transfers the video content transcoded into multiple formats directly to storage by accessing non-volatile memory 140 of server 120.

Direct transcoding program 200 transcodes received encoded steaming video 115 into multiple video files having format parameters aligned with configurations set by server 120. Transcoding converts video (or audio) files from one encoding format to other formats to increase the number of compatible target devices on which the media file can play. In some embodiments, direct transcoding program 200 receives the stream of incoming encoded video directly from the memory (volatile memory) of FPGA device 130, bypassing memory read, copy, and write operations of server 120. Direct transcoding program 200 converts the encoded video that has one parameter set into multiple video files having different parameter sets that result in various video formats. The video formats may include different resolution (i.e., 720p, 1080p, 4K), different bit rates (i.e., 2 Mbps, 5 Mbps), and different frame rates (i.e., 20 fps, 30 fps) among other parameters. In embodiments of the present invention, after transcoding completion, direct transcoding program 200, operating with FPGA device 130, signals the host server, such as server 120, which sets up a transfer of the transcoded video files directly from FPGA device 130 to the non-volatile memory of server 120.

Non-volatile memory 140 provides persistent memory storage for server 120. Non-volatile memory retains stored data regardless of whether the computing device, is powered on or off. In some embodiments, non-volatile memory 140 may be a hard drive, a solid-state drive (SSD), magnetic tape drive, optical disc, and flash memory, for example. In some embodiments of the present invention, FPGA device 130 has access to transmit transcoded video files directly to non-volatile memory 140 of server 120. In an embodiment, FPGA device 130 is enabled with direct access to non-volatile memory 140 as part of server 120's memory address space, by use of a protocol, such as CAPI.

Figure 2:
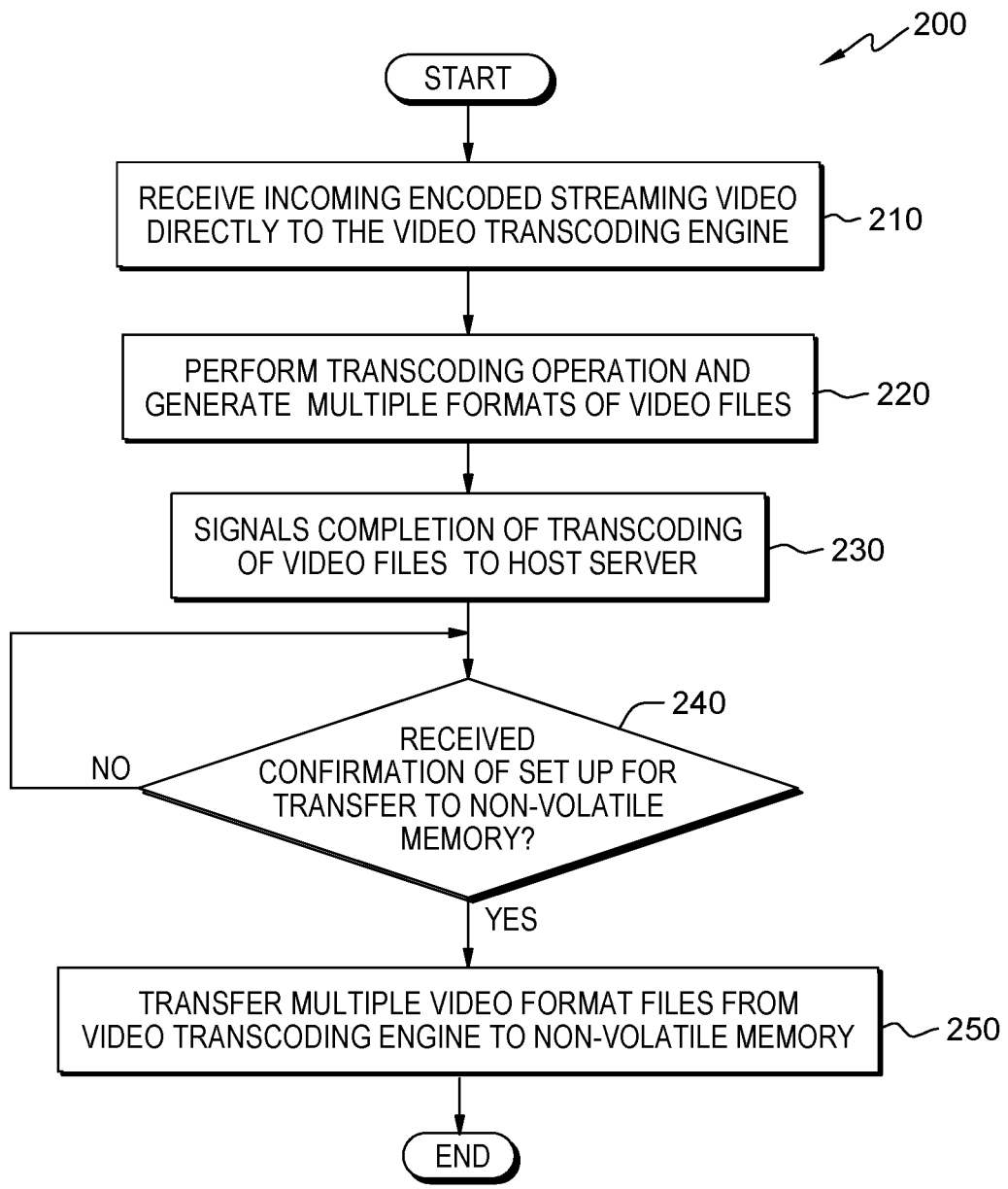
FIG. 2 is a flowchart depicting operational steps of a direct transcoding program operating in the distributed data processing environment of FIG. 1, in accordance with embodiments of the present invention.

FIG. 2 is a flowchart depicting operational steps of direct transcoding program 200, operating in distributed data processing environment 100 of FIG. 1, in accordance with embodiments of the present invention. In embodiments of the present invention, a user operating a client computing device initiates uploading of encoded video content to a host server configured to receive the control information of the uploading encoded video and direct the uploaded encoded video stream directly to a video transcoding engine. In some embodiments of the present invention, the splitting of the connection between the client computing device and the server is built over a network protocol, such as HTTP, RTSP, or UDP, and utilizing network software ports or a dedicated IP address, for example. The video transcoding engine may be an FPGA device or ASIC device integrated with or connected to the host server.

Direct transcoding program 200 receives incoming encoded streaming video directly to the video transcoding engine (step 210). Direct transcoding program 200 receives an incoming video stream redirected by the host server to a video transcoding engine integrated with or connected to the host server. The memory of the video transcoding engine directly receives the incoming video stream uploaded from a client computing device connected to the host server without first being written to the host server memory (volatile memory), avoiding server copying and transferring operations. In some embodiments, a configuration of the host server enables the host server to receive control information from the connection with the client computing device and redirect the video content received directly to the video transcoding engine.

For example, direct transcoding program 200 receives encoded streaming video 115 uploaded from computing device 110 via network 150 to server 120. Direct transcoding program 200 receives encoded streaming video 115, which is directed by server 120 directly to FPGA device 130 integrated with server 120.

Direct transcoding program 200 performs transcoding operations and generates multiple formats of video files (step 220). In some embodiments of the present invention, direct transcoding program 200 includes modules that perform transcoding operations on received encoded streaming video and convert the video stream received in a compressed and encoded format based on one set of parameters into one or more video formats having different sets of parameters that are configured by the host server settings. In other embodiments, direct transcoding program 200 operates as a communicative connection to application modules that perform transcoding operations on the received encoded streaming video (not shown in FIG. 1). Direct transcoding program 200 generates one or multiple video files having different formats based on the parameter configurations set by the host server.

For example, direct transcoding program 200 directs FPGA device 130 to perform transcoding of encoded streaming video 115 received from computing device 110. Direct transcoding program 200 determines the transcoding parameters from server 120 and directs FPGA device 130 to generate video files based on the transcoding parameters.

Direct transcoding program 200 signals to the host server the completion of the transcoding of video files (step 230). Direct transcoding program 200 determines the completion of transcoding operations associated with the received encoded streaming video and notifies the host server of the transcoding completion. The completed transcoded video formatted files reside in the memory of the video transcoding engine integrated or connected to the host server, having avoided writing to or reading from the host server memory.

For example, direct transcoding program 200 signals to server 120 the completion of the transcoding of encoded streaming video 115 received from computing device 110. The completed transcoded video files reside in the memory (volatile) of FPGA device 130.

Direct transcoding program 200 determines whether a confirmation of the set-up of transcoded video file transfer to non-volatile memory is received (decision step 240). Having signaled completion of the transcoding of the received encoded streaming video and generation of multiple format video files, direct transcoding program 200 listens for receipt of confirmation that the host server has set up a transfer of the transcoded video files to non-volatile memory. For the case in which direct transcoding program 200 determines that a confirmation of the file transfer to non-volatile memory has not been set up (step 240, "NO" branch), direct transcoding program 200 continues to listen (i.e., a monitor) for confirmation (decision step 240). For the case in which direct transcoding program 200 determines that a confirmation from the host server has been received (step 240 "YES" branch), direct transcoding program 200 proceeds to step 250 to transfer video files.

For example, direct transcoding program 200 sends a signal of notification to server 120 that the transcoding of encoded streaming video 115 is complete. Direct transcoding program 200 determines receipt of a confirmation from server 120 that transfer operations to non-volatile memory have been set up and are ready for direct transfer from FPGA device 130 to the non-volatile memory of server 120.

Direct transcoding program 200 transfers multiple formats of video files from the video transcoding engine directly to non-volatile memory (step 250). Direct transcoding program 200 transfers the video files from the video transcoding engine directly to the non-volatile memory of the host server without writing to the memory (volatile) of the host server. In some embodiments, the transcoding of the encoded streaming video results in multiple files having different formats based on different sets of parameters as set by the host server. Direct transcoding program 200 transfers the multiple video files from the volatile memory of the video transcoding engine directly to the non-volatile memory of the host server. The direct transfer of encoded streaming video to and from the video transcoding engine by direct transcoding program 200 results in a transcoding process that minimal impact on the host server, which frees the host server to perform other tasks, reduces memory transfers, reduces power consumption, and lowers latency associated with the transcoding process.

For example, direct transcoding program 200 initiates the transfer of the transcoded video files from the memory of FPGA device 130 to non-volatile memory 140 of server 120.

Having transferred the transcoded video files directly to non-volatile memory, direct transcoding program 200 communicates the state of the non-volatile memory to the server (step 260). Direct transcoding program 200 communicates the information associated with the transfer of transcoded video files from the video transcoding engine to the non-volatile memory of the host server. For example, direct transcoding program 200 communicates the memory transfer information to server 120 associated with the transfer of the transcoded video files to non-volatile memory 140. Having completed the transfer of the transcoded video files and providing server 120 with the transfer information, direct transcoding program 200 ends.

Figure 3:
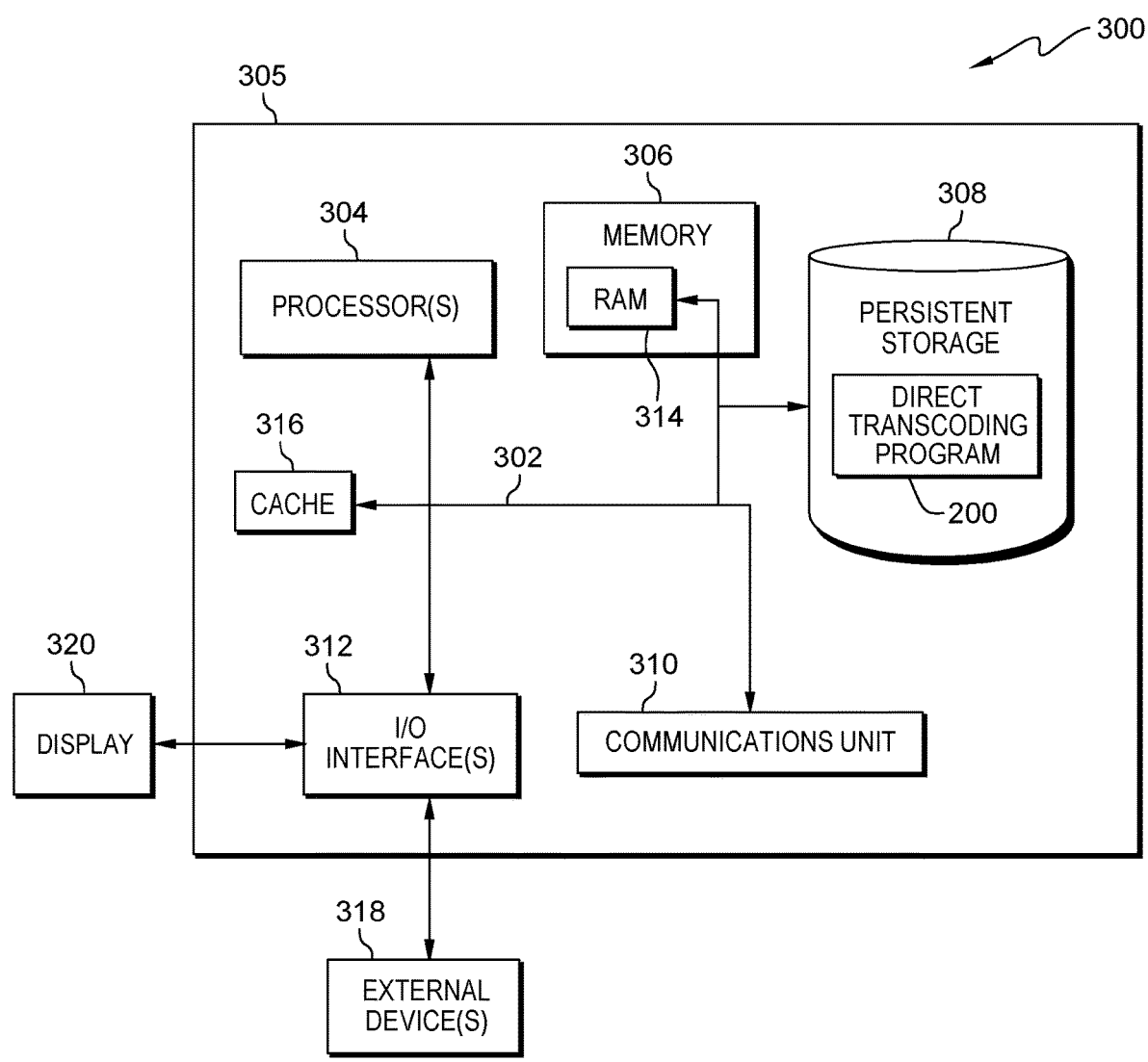
FIG. 3 depicts a block diagram of components of a computing system, including a computing device configured to operationally perform the direct transcoding program of FIG. 2, in accordance with an embodiment of the present invention.

FIG. 3 depicts a block diagram of components of a computing system, including computing device 305, configured to include or operationally connect to components depicted in FIG. 1, and with the capability to operationally perform direct transcoding program 200 of FIG. 3, in accordance with an embodiment of the present invention.

Computing device 305 includes components and functional capability similar to components of server 120, (FIG. 1), in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 305 includes communications fabric 302, which provides communications between computer processor(s) 304, memory 306, persistent storage 308, communications unit 310, an input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306, cache memory 316, and persistent storage 308 are computer-readable storage media. In this embodiment, memory 306 includes random access memory (RAM) 314. In general, memory 306 can include any suitable volatile or non-volatile computer-readable storage media.

In one embodiment, direct transcoding program 200 is stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of distributed data processing environment 100. In these examples, communications unit 310 includes one or more network interface cards. Communications unit 310 may provide communications through the use of either or both physical and wireless communications links. Direct transcoding program 200 may be downloaded to persistent storage 308 through communications unit 310.

I/O interface(s) 312 allows for input and output of data with other devices that may be connected to computing system 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., direct transcoding program 200 can be stored on such portable computer-readable storage media and can be loaded onto persistent storage 308 via I/O interface(s) 312. I/O interface(s) 312 also connects to a display 320.

Display 320 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for transcoding an encoded video stream, the method comprising:
   receiving, by one or more processors, an encoded video stream from a client computing device, wherein the encoded video stream is directly received by a video transcoding engine integrated with a host server;
   generating, by the one or more processors, one or more transcoded video files in real time from the encoded video stream; and
   transferring, by the one or more processors, the one or more transcoded video files from the video transcoding engine directly to a non-volatile memory of the host server and bypassing a volatile memory of the host server, based on a protocol creating a coherency of access to a non-volatile storage of the host server.

2. The method of claim 1, wherein the video transcoding engine is a field-programmable gate array (FPGA) device connected to the host server and the FPGA device intercepts an incoming encoded video stream and performs a transcoding in real-time.

3. The method of claim 1, wherein the video transcoding engine is an application-specific integrated circuit (ASIC) device connected to the host server and the ASIC device intercepts an incoming encoded video stream and performs a transcoding in real-time.

4. The method of claim 1, further comprising:
   receiving, by the one or more processors, the encoded video stream by splitting of a connection between the client computing device and the host server, wherein the splitting of the connection results in a flow of the encoded video stream to the video transcoding engine and a flow of control information to the host server, and wherein the splitting of the connection is enabled by configuring a network protocol, and wherein the splitting of the connection is further enabled by use of software ports of the host server.

5. The method of claim 1, further comprising:
receiving, by the one or more processors, the encoded video stream by a coherency of the non-volatile memory between the video transcoding engine and the host server, wherein the video transcoding engine is a field-programmable gate array (FPGA) device, and wherein the FPGA device is granted access to an address space of the host server, by applying a coherent accelerator processor interface (CAPI) protocol.

6. The method of claim 1, further comprising:
writing, by the one or more processors, the one or more transcoded video files of the encoded video stream to a coherently accessed non-volatile memory of the host server; and
communicating, by the one or more processors, a state of the coherently accessed non-volatile memory of the host server, to the host server.

7. The method of claim 1, wherein the video transcoding engine is a coherent accelerator processor interface (CAPI) attached field-programmable gate array device.

8. The method of claim 1, wherein the video transcoding engine is an application-specific integrated circuit (ASIC) device, integrated with the host server.

9. A computer program product for transcoding an encoded video stream, the method comprising:
one or more computer-readable storage media and program instructions stored on the one or more computer-readable storage media, the program instructions comprising:
program instructions to receive an encoded video stream from a client computing device, wherein the encoded video stream is directly received by a video transcoding engine integrated with a host server;
program instructions to generate one or more transcoded video files in real time from the encoded video stream; and
program instructions to transfer, the one or more transcoded video files from the video transcoding engine directly to a non-volatile memory of the host server and bypassing a volatile memory of the host server, based on a protocol creating a coherency of access to a non-volatile storage of the host server.

10. The computer program product of claim 9, wherein the video transcoding engine is a field-programmable gate array (FPGA) device connected to the host server and the FPGA device intercepts an incoming encoded video stream and performs a transcoding in real-time.

11. The computer program product of claim 9, wherein the video transcoding engine is an application-specific integrated circuit (ASIC) device connected to the host server and the ASIC device intercepts an incoming encoded video stream and performs a transcoding in real-time.

12. The computer program product of claim 9, further comprising:
receiving, by the one or more processors, the encoded video stream by splitting of a connection between the client computing device and the host server, wherein the splitting of the connection results in a flow of the encoded video stream to the video transcoding engine and a flow of control information to the host server, and wherein the splitting of the connection is enabled by configuring a network protocol, and wherein the splitting of the connection is further enabled by use of dedicated IP addresses.

13. The computer program product of claim 9, further comprising:
receiving, by the one or more processors, the encoded video stream by a coherency of the non-volatile memory between the video transcoding engine and the host server, wherein the video transcoding engine is a field-programmable gate array (FPGA) device, and wherein the FPGA device is granted access to an address space of the host server, by applying a coherent accelerator processor interface (CAPI) protocol.

14. The computer program product of claim 9, wherein the video transcoding engine is a coherent accelerator processor interface (CAPI) with an attached device selected from the group consisting of a field-programmable gate array device and an application-specific integrated circuit.

15. A computer system for transcoding an encoded video stream, the method comprising:
one or more computer processors;
one or more computer-readable storage media;
program instructions stored on the one or more computer-readable storage media, the program instructions comprising:
program instructions to receive an encoded video stream from a client computing device, wherein the encoded video stream is directly received by a video transcoding engine integrated with a host server;
program instructions to generate one or more transcoded video files in real time from the encoded video stream; and
program instructions to transfer, the one or more transcoded video files from the video transcoding engine directly to a non-volatile memory of the host server and bypassing a volatile memory of the host server, based on a protocol creating a coherency of access to a non-volatile storage of the host server.

16. The computer system of claim 15, wherein the video transcoding engine is a field-programmable gate array (FPGA) device connected to the host server and the FPGA device intercepts an incoming encoded video stream and performs a transcoding in real-time.

17. The computer system of claim 15, wherein the video transcoding engine is an application-specific integrated circuit (ASIC) device connected to the host server and the ASIC device intercepts an incoming encoded video stream and performs a transcoding in real-time.

18. The computer system of claim 15, further comprising:
receiving, by the one or more processors, the encoded video stream by splitting of a connection between the client computing device and the host server, wherein the splitting of the connection results in a flow of the encoded video stream to the video transcoding engine and a flow of control information to the host server, and wherein the splitting of the connection is enabled by configuring a network protocol, and wherein the splitting of the connection is further enabled by use of dedicated IP addresses.

19. The computer system of claim 15, further comprising:
receiving, by the one or more processors, the encoded video stream by a coherency of the non-volatile memory between the video transcoding engine and the host server, wherein the video transcoding engine is a field-programmable gate array (FPGA) device, and wherein the FPGA device is granted access to an address space of the host server, by applying a coherent accelerator processor interface (CAPI) protocol.

20. The computer system of claim 15, wherein the video transcoding engine is a coherent accelerator processor interface (CAPI) with an attached device selected from the group consisting of a field-programmable gate array device and an application-specific integrated circuit.

* * * * *